(12) United States Patent  
Casarotto

(10) Patent No.: US 6,716,134 B1
(45) Date of Patent: Apr. 6, 2004

(54) STEP-UP REDUCTION GEARING

(75) Inventor: Marco Casarotto, Rovigo (IT)

(73) Assignee: Casarotto G. & C. S.r.l., Badia Polesine (IT)

( * ) Notice: Subject to any disclaimer, the term of this patent is extended or adjusted under 35 U.S.C. 154(b) by 0 days.

(21) Appl. No.: 10/048,859

(22) PCT Filed: Jun. 14, 2000

(86) PCT No.: PCT/EP00/05451
§ 371 (c)(1),
(2), (4) Date: Apr. 19, 2002

(87) PCT Pub. No.: WO01/11266
PCT Pub. Date: Feb. 15, 2001

(30) Foreign Application Priority Data

Aug. 5, 1999 (IT) .......................... PD99A0184

(51) Int. Cl.⁷ .............................. F16H 57/08
(52) U.S. Cl. ........................ 475/331; 475/343
(58) Field of Search ................. 475/149, 331, 475/343, 336; 74/331

(56) References Cited

U.S. PATENT DOCUMENTS 3,459,070 A * 8/1969 Holdeman ................. 475/343
3,770,074 A * 11/1973 Sherman ................... 475/343
3,854,349 A * 12/1974 Michling ................... 475/337
4,158,971 A   6/1979 Szalai et al. .............. 475/343
4,254,669 A * 3/1981 Schulz ..................... 475/343
4,380,274 A * 4/1983 Abraham et al. .......... 475/343
4,384,498 A * 5/1983 Eichinger ................. 475/343
4,662,246 A * 5/1987 Cheek et al. ............. 475/343

FOREIGN PATENT DOCUMENTS

DE    295 02 981    8/1996
FR    2 378 647     8/1978
GB    1 340 593     12/1973

OTHER PUBLICATIONS

International Search Report dated Nov. 30, 2000.

* cited by examiner

Primary Examiner—Tisha D Lewis
(74) Attorney, Agent, or Firm—RatnerPrestia

(57) ABSTRACT

A speed reducer comprising at least one first reduction stage and one second reduction stage (3, 4), in which the second stage (4) has cylindrical gears (5, 6) with drive input and output shafts (8, 7) having parallel axes, and in which the drive input shaft (8) of the second stage (4) is hollow and houses coaxially a drive input shaft (17) of the first stage (3), the first reduction stage (3) being disposed at an end of the hollow shaft (8) axially remote from the position in which a motor (15) is mounted.

14 Claims, 2 Drawing Sheets

STEP-UP REDUCTION GEARING

This application is a U.S. national-phase application of PCT International Application No. PCT/EP00/05451.

TECHNICAL FIELD

The subject of the present invention is a speed reducer of the type comprising at least one first reduction stage and one second reduction stage, in which the second stage has cylindrical gears with drive input and output shafts having parallel axes.

BACKGROUND ART

The term "reducer" is used in this context in its most general meaning of a transmission member which can operate either to reduce or to gear up the relative speeds of a main drive input shaft and a main drive output shaft. A reducer including the characteristics listed above is known by the term "CYCLO MODULAR SYSTEM" and is produced by Sumitomo Cyclo Drive Europe Ltd.

This CYCLO transmission system is particularly useful when it is necessary to use a reducer with parallel or perpendicular axes having a high reduction ratio. It is very suitable for oscillating mounting. CYCLO reducers consist of a first cycloidal reduction stage combined with a second reduction stage with parallel axes, having a hollow drive output shaft. A main disadvantage of this transmission system is its axial bulkiness which, particularly for oscillating mounting, is unsuitable for certain applications in which axial compactness of the reducer is fundamental.

DISCLOSURE OF THE INVENTION

The main task of the present invention is to provide a speed reducer which is designed structurally and functionally to prevent the technical problems complained of with reference to the prior art mentioned.

BRIEF DESCRIPTION OF THE DRAWINGS

This problem is solved by the invention by means of a speed, reducer of the above-mentioned type, formed in accordance with the appended claims.

The characteristics and the advantages of the invention will become clearer from the detailed description of two preferred embodiments thereof, described by ay of non-limiting example with reference to the appended drawings, in which.

BEST MODE FOR CARRYING OUT THE INVENTION

Figure 1:
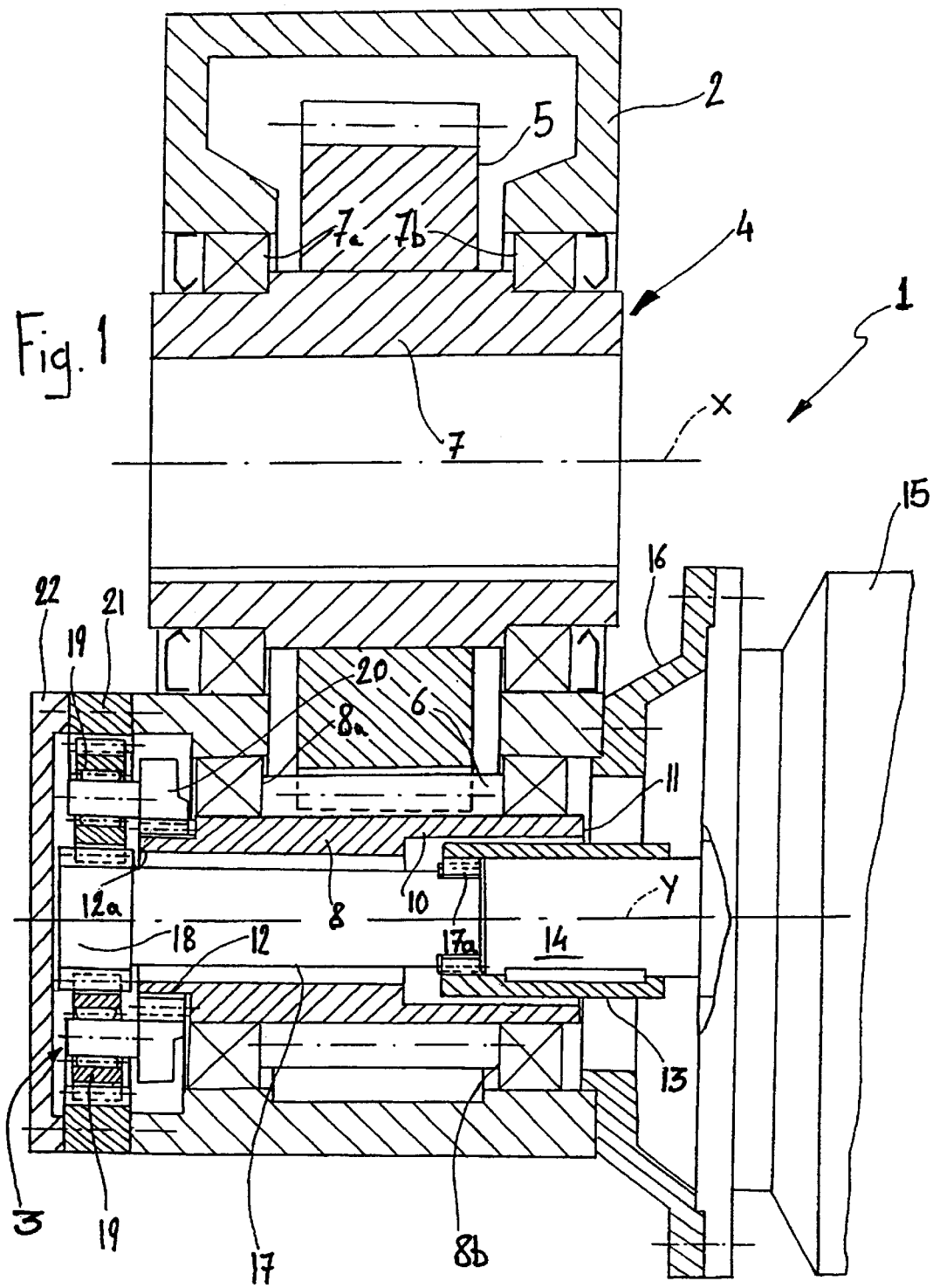
FIG. 1 is a schematic, axially-sectioned view of a speed reducer formed in accordance with a first embodiment of the present invention.

With reference to FIG. 1, a speed reducer formed in accordance with the invention, generally indicated 1, comprises a casing 2, inside which a first reduction stage and a second reduction stage, indicated 3 and 4, respectively, are at least partially housed.

The second reduction stage 4 comprises a pair of cylindrical gears 5, 6 with parallel axes X, Y, mounted in a mutually meshed condition and keyed to respective tubular shafts 7, 8. The shaft 7 constitutes the main drive output shaft of the reducer, is supported on bearings 7a, 7b, and is hollow to permit oscillating mounting of the reducer 1, if desired.

The shaft 8 constitutes the drive input shaft to the second stage of the reducer and is also hollow with an internal portion 10 of enlarged diameter at a first 11 of its ends, and an outer portion 12 carrying a set of teeth or other torsional coupling means at an opposite end 12a. The shaft 8 is supported for rotation in the casing 2 by means of bearing 8a, 8b.

The internal portion 10 of enlarged diameter at least partially houses a coupling 13, for example, a box coupling, keyed to a drive shaft 14 of an electric motor 15 which in turn is mounted on the casing 2 by means of a flanged coupling 16. The shaft 8 of the second reduction stage houses, with ample radial clearance, a drive-input shaft 17 of the first reduction stage 3. The shaft 17 is connected, for example, by means of a splined coupling 17a, for rotation with the drive shaft 14, by means of the coupling 13. The reduction stage 3 comprises an epicyclic reducer with a sun gear 18 fixed to the end of the shaft 17 remote from the motor 15, for example, by being formed integrally therewith. The sun gear 18 is meshed with a plurality of planetary gears, 19 mounted on a spider 20 in conventional, manner and also meshing with a ring gear 21 fixed to the casing 2. The spider 20 in turn is coupled for rotation with the drive input shaft 8 of the second reduction stage by keying to the teeth 12 thereof. In practice, the entire epicyclic reducer of the first reduction stage is mounted on the casing 2 and partially or entirely housed therein, at the end remote from the position in which the electric motor 15 is mounted, thus affording the, reducer 1 considerable axial compactness. In fact, the ring gear 21 and a cover 22 fixed in a leaktight manner thereto constitute a housing for any portion of the first reduction stage which projects from the casing 2. This compactness is further improved by the fact that, with the structure described, it is possible to nest the coupling 13 and the shaft 14 of the motor 15 at least partially inside the larger-diameter cavity portion 10 of the shaft 8 by which the second reduction stage is kinematically connected to the first stage.

Figure 2:
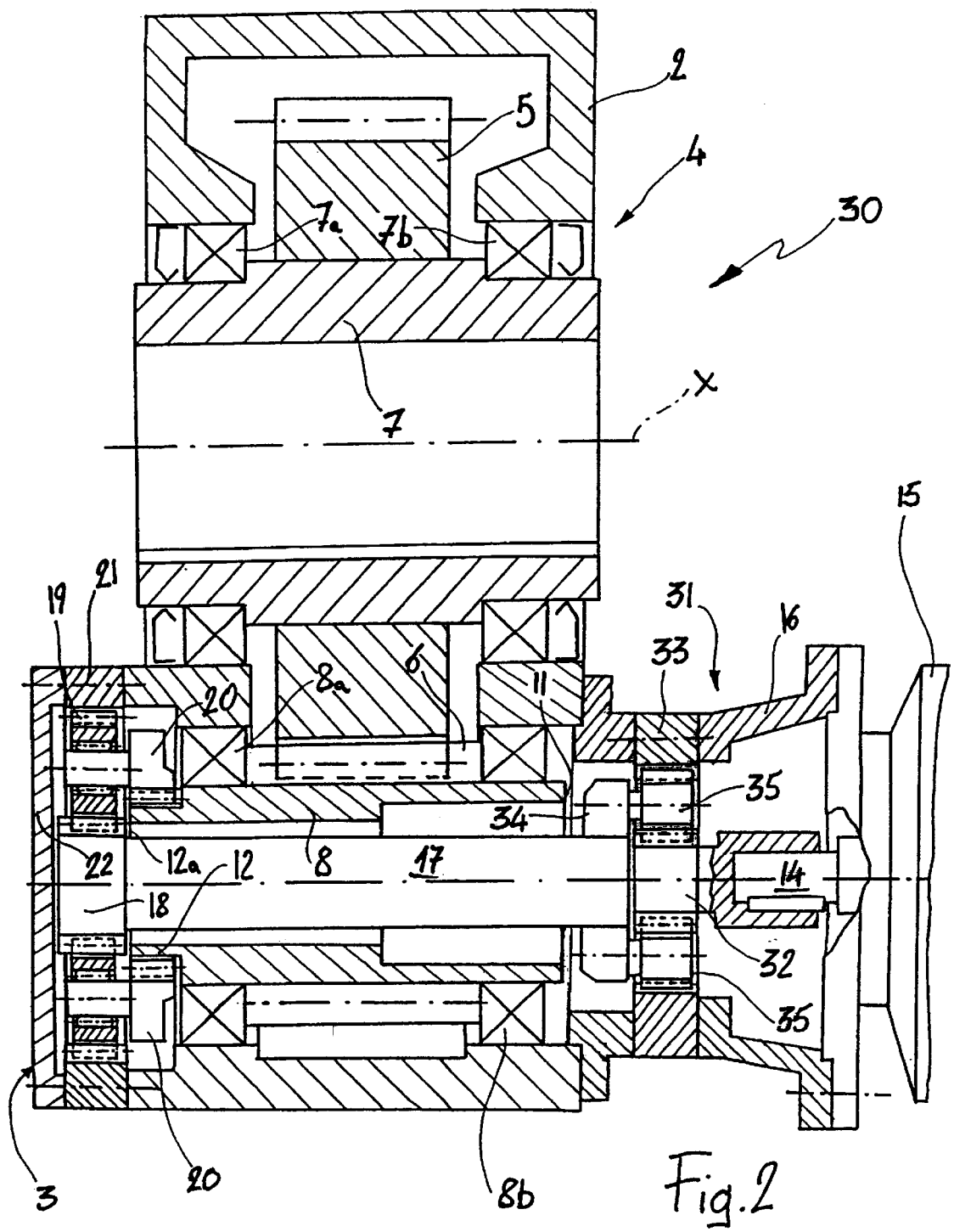
FIG. 2 is a schematic, axially-sectioned view of a second embodiment of the speed reducer according to the invention.

FIG. 2 shows a second embodiment of the reducer according to the present invention The reducer of the second embodiment is generally indicated 30 and details similar to those of the previous embodiment are indicated by the same reference numerals.

In practice, the reducer 30 differs from the reducer 1 of the first embodiment solely in that a further so-called pre-reduction stage 31 is provided between the electric motor and the first reduction stage 3 and is in the form of an epicyclic reducer with a sun gear 32 fixed to the drive shaft 14, a ring gear 33 fixed to the casing 2, and a spider 34 fixed to the drive-input shaft 17 of the first reduction stage 3 and kinematically connected by means of a plurality of planetary gears 35 to the sun gear 32 and to the ring gear 33, in conventional manner. For the connection to the motor and to the casing 2, as well as for holding the pre-reduction stage, the flanged coupling 16 has suitable dimensions and is connected to the casing with the interposition of the ring gear 33. A transmission or an angular reducer, may be fitted as an alternative or in addition to the pre-reduction stage 31, in conventional manner.

The invention thus solves the problem posed, providing a reducer which, as well as having truly remarkable axial compactness in comparison with competing products, affords considerable versatility, since the reducer 1 can be combined in various ways with the pre-reduction stage 31, and/or with angular reducers with converging axes, to satisfy particular requirements, simply by the assembly of a basic structure, that is, that of the first embodiment described, optionally with the most suitable pre-reduction stage, Amongst the further advantages achieved by the invention is the fact that the first reduction stage is easily and fully accessible simply by removing the cover 22 without requiring dismantling of the motor or other onerous operations; moreover, the complete and improved accessibility of the first reduction stage enables brakes, anti-reversing devices for rendering the rotation of the reducer unidirectional, and other accessories which may advantageously be associated with the main drive input shaft 17, to be connected easily to the first reduction stage, with the clear advantage of operating on gear shafts with low transmitted torque,

What is claimed is:

1. A speed reducer comprising:

a casing;

a motor mounted in a position on the casing;

at least one first reduction stage (a) being at least partially housed in the casing, (b) including a drive input shaft, and (c) comprising an epicyclic reducer with a spider carrying a plurality of planetary gears meshing with a ring gear and with a sun gear, the ring gear forming part of the casing housing at least partially the epicyclic reducer; and at least one second reduction stage (a) being at least partially housed in the casing and (b) including cylindrical gears with a hollow drive input shaft and an output shaft having parallel and spaced axes, the hollow drive input shaft housing coaxially the drive input shaft of the first reduction stage with the first reduction stage being disposed at an end of the hollow drive input shaft axially remote from the position in which the motor is mounted and with the drive input shaft of the first reduction stage coupled to the hollow drive input shaft of the second reduction stage for rotation with the sun gear and the spider, respectively, for the drive transmission from the first to the second reduction stage.

2. The reducer according to claim 1, in which the drive output shaft of the second reduction stage is hollow.

3. The reducer according to claim 2, further comprising a pre-reduction stage provided between the first reduction stage and the motor.

4. The reducer according to claim 3, in which the pre-reduction stage comprises an epicyclic reducer.

5. The reducer according to claim 2, in which at least one component of the first reduction stage is accessible through the casing at the opposite end to the position in which the motor is mounted.

6. The reducer according to claim 5, in which access to the at least one component of the first reduction stage is closed releasably by a cover at the opposite end of the casing to the position in which the motor is mounted.

7. The reducer according to claim 1, further comprising a pre-reduction stage provided between the first reduction stage and the motor.

8. The reducer according to claim 7, which the pre-reduction stage comprises an epicyclic reducer.

9. The reducer according to claim 7, in which at least one component of the first reduction stage is accessible through the casing at the opposite end to the position in which the motor is mounted.

10. The reducer according to claim 9, in which access to the at least one component of the first reduction stage is closed releasably by a cover at the opposite end of the casing to the position in which the motor is mounted.

11. The reducer according to claim 1, in which at least one component of the first reduction stage is accessible through the casing at the opposite end to the position in which the motor is mounted.

12. The reducer according to claim 11, in which access to the at least one component of the first reduction stage is closed releasably by a cover at the opposite end of the casing to the position in which the motor is mounted.

13. The reducer according to claim 1, in which the first reduction stage is accessible through the casing at the opposite end to the position in which the motor is mounted.

14. The reducer according to claim 13, in which access to the first reduction stage is closed releasably by a cover at the opposite end of the casing to the position in which the motor is mounted.

* * * * *